United States Patent
Hakamata

(10) Patent No.: US 9,574,616 B2
(45) Date of Patent: Feb. 21, 2017

(54) JOINT DEVICE AND MOTOR

(71) Applicant: ASMO CO., LTD., Shizuoka-ken (JP)

(72) Inventor: Kazuyuki Hakamata, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 14/638,687

(22) Filed: Mar. 4, 2015

(65) Prior Publication Data

US 2015/0252854 A1    Sep. 10, 2015

(30) Foreign Application Priority Data

Mar. 5, 2014 (JP) ................................. 2014-042773

(51) Int. Cl.
| | |
|---|---|
| *F16D 3/68* | (2006.01) |
| *H02K 7/116* | (2006.01) |
| *H02K 7/00* | (2006.01) |
| *F16D 3/02* | (2006.01) |

(52) U.S. Cl.
CPC ............... *F16D 3/68* (2013.01); *H02K 7/003* (2013.01); *H02K 7/1166* (2013.01); *F16D 3/02* (2013.01)

(58) Field of Classification Search
CPC ............... F16D 3/02; F16D 3/12; F16D 3/50; F16D 3/64; F16D 3/68; F16D 3/78; H02K 7/003; H02K 7/1166
USPC .... 464/73–76, 81, 92–94, 96, 149, 157–159
See application file for complete search history.

(56) References Cited

U.S. PATENT DOCUMENTS

| | | | | |
|---|---|---|---|---|
| 2,025,825 | A | * | 12/1935 | Ricefield ................... F16D 3/68 464/73 |
| 2,025,828 | A | * | 12/1935 | Ricefield ................... F16D 3/68 464/73 |
| 2,025,829 | A | * | 12/1935 | Ricefield ................... F16D 3/68 464/73 |
| 2,034,001 | A | * | 3/1936 | Ricefield ................... F16D 3/68 464/73 |
| 3,831,724 | A | * | 8/1974 | Baer ..................... F16D 43/211 192/56.51 |
| 2003/0180163 | A1 | | 9/2003 | Hartmann et al. |

FOREIGN PATENT DOCUMENTS

JP         2002364713        12/2002

* cited by examiner

*Primary Examiner* — Josh Skroupa
(74) *Attorney, Agent, or Firm* — Patterson Thuente Pedersen, P.A.

(57) ABSTRACT

A joint device includes a drive rotor fixed to a drive shaft, a driven rotor fixed to a driven shaft, and a ring-shaped buffer located between the drive rotor and the driven rotor. The drive rotor includes a drive engagement portion that projects toward the driven rotor in an axial direction. The driven rotor includes a driven engagement portion that projects toward the drive rotor in the axial direction. The buffer includes an outer surface, which includes a first engagement recess and a second engagement recess that are recessed toward a radially inner side. An outer diameter of a bottom surface of the second engagement recess is smaller than an inner diameter of the driven engagement portion or an outer diameter of a bottom surface of the first engagement recess is smaller than an inner diameter of the drive engagement portion.

10 Claims, 5 Drawing Sheets

JOINT DEVICE AND MOTOR

BACKGROUND ART

The present invention relates to a joint device and a motor.

Japanese Laid-Open Patent Publication No. 2002-364713 describes a prior art example of a motor in which a drive shaft of a motor body and a driven shaft (referred to as "worm shaft" in the publication) are coupled by a joint device so that the rotation generated by the motor body is transmitted from the drive shaft to the driven shaft by the joint device.

The above joint device includes a drive rotor fixed to the drive shaft of the motor body, a driven rotor fixed to the driven shaft, and a ring-shaped buffer (rubber member) located between the drive rotor and the driven rotor. The drive rotor and the driven rotor each include an engagement portion. The engagement portions project in an axial direction toward each other. The outer surface of the buffer includes a first engagement recess and a second engagement recess respectively receiving the drive engagement portion and the driven engagement portion. The drive engagement portion contacts the first engagement recess of the buffer in the rotation direction, and the driven engagement portion contacts the second engagement recess of the buffer in the rotation direction. This transmits a rotation force from the drive engagement portion to the driven engagement portion through the buffer. Thus, the buffer absorbs the impact produced when rotation is transmitted in the joint device.

However, if coupling tolerances result in misalignment between the drive shaft and the driven shaft, resistance that occurs between the drive engagement portion and the driven engagement portion in the joint device may hinder the smooth transmission of rotation. Although the above publication describes that the elasticity of the buffer allows for misalignment between the drive shaft and the driven shaft, rotation cannot be smoothly transmitted only by the elasticity of the buffer.

SUMMARY OF THE INVENTION

It is an object of the present invention is to provide a joint device and a motor capable of smoothly transmitting rotation even when a drive shaft and a driven shaft are misaligned.

To achieve the above object, a joint device of one embodiment of the present invention includes a drive rotor fixed to a drive shaft, a driven rotor fixed to a driven shaft, and a ring-shaped buffer located between the drive rotor and the driven rotor. The drive rotor includes a drive engagement portion that projects toward the driven rotor in an axial direction. The driven rotor includes a driven engagement portion that projects toward the drive rotor in the axial direction. The buffer includes an outer surface, which includes a first engagement recess and a second engagement recess that are recessed toward a radially inner side. The drive engagement portion is inserted into the first engagement recess engageable in a rotation direction. The driven engagement portion is inserted into the second engagement recess engageable in the rotation direction. An outer diameter of a bottom surface of the second engagement recess is smaller than an inner diameter of the driven engagement portion or an outer diameter of a bottom surface of the first engagement recess is smaller than an inner diameter of the drive engagement portion.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor will now be described.

Figure 1:
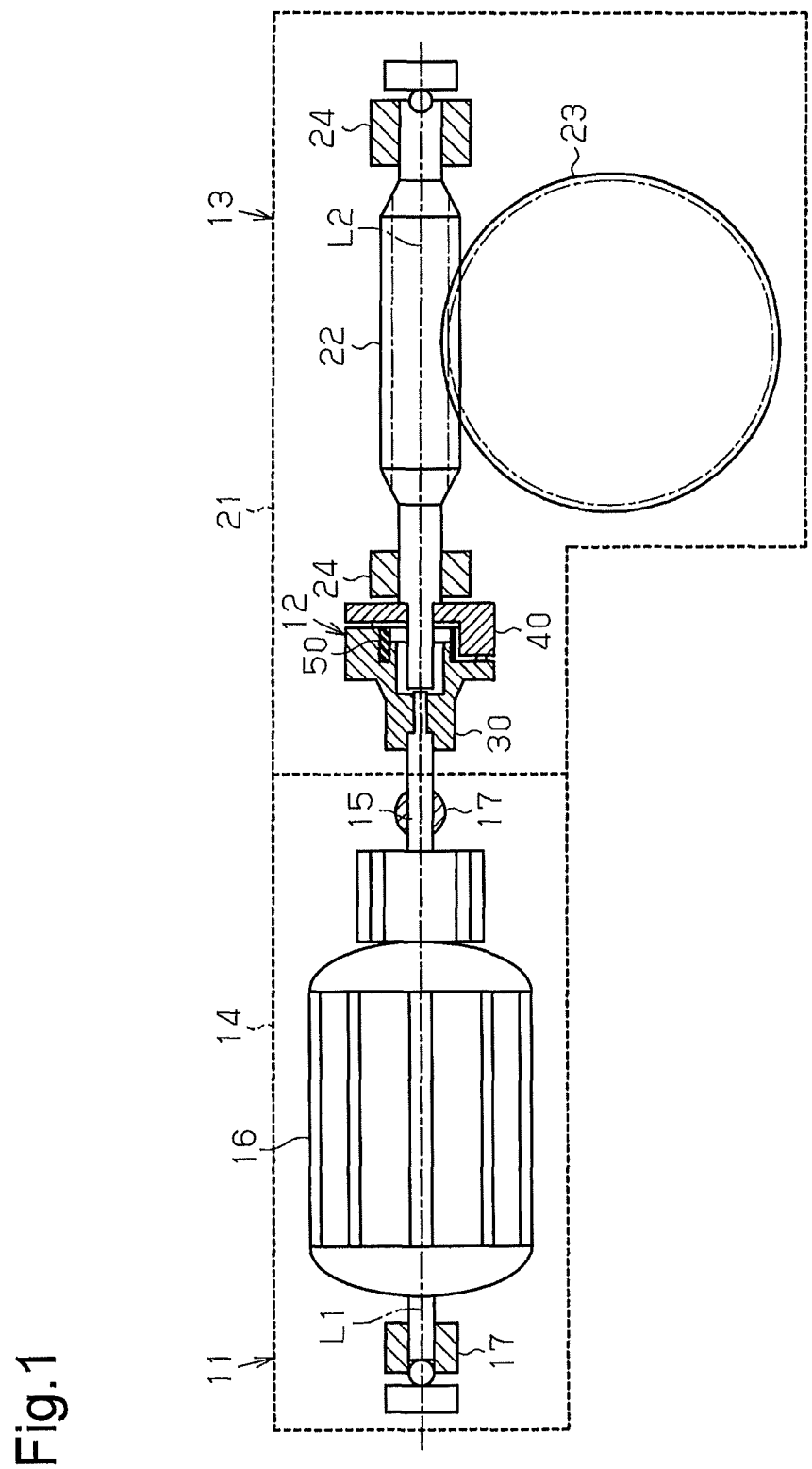
FIG. 1 is a schematic view of a motor according to one embodiment of the present invention.

As shown in FIG. 1, the motor of the present embodiment is configured so that the rotation output of a motor body 11 can be transmitted by a joint device 12 to a reduction drive 13.

The motor body 11 includes a yoke housing 14, a drive shaft 15 accommodated in the yoke housing 14, and an armature 16 that rotates integrally with the drive shaft 15. The drive shaft 15 is supported by two bearings 17 that are supported by the yoke housing 14.

The reduction drive 13 includes a gear housing 21 coupled to the yoke housing 14, a worm shaft 22 (driven shaft) accommodated in the gear housing 21, and a worm wheel 23 that meshes with the worm shaft 22. The worm shaft 22 is supported by two bearings 24, which are supported by the gear housing 21, coaxially with the drive shaft 15 of the motor body 11. The worm shaft 22 and the drive shaft 15 are coupled by the joint device 12, which is accommodated in the gear housing 21. Thus, the rotation of the drive shaft 15 can be transmitted to the worm shaft 22 via the joint device 12. The worm wheel 23 transmits the rotation of the worm shaft 22 to an output shaft (not shown) of the motor.

Joint Device

Figure 2:
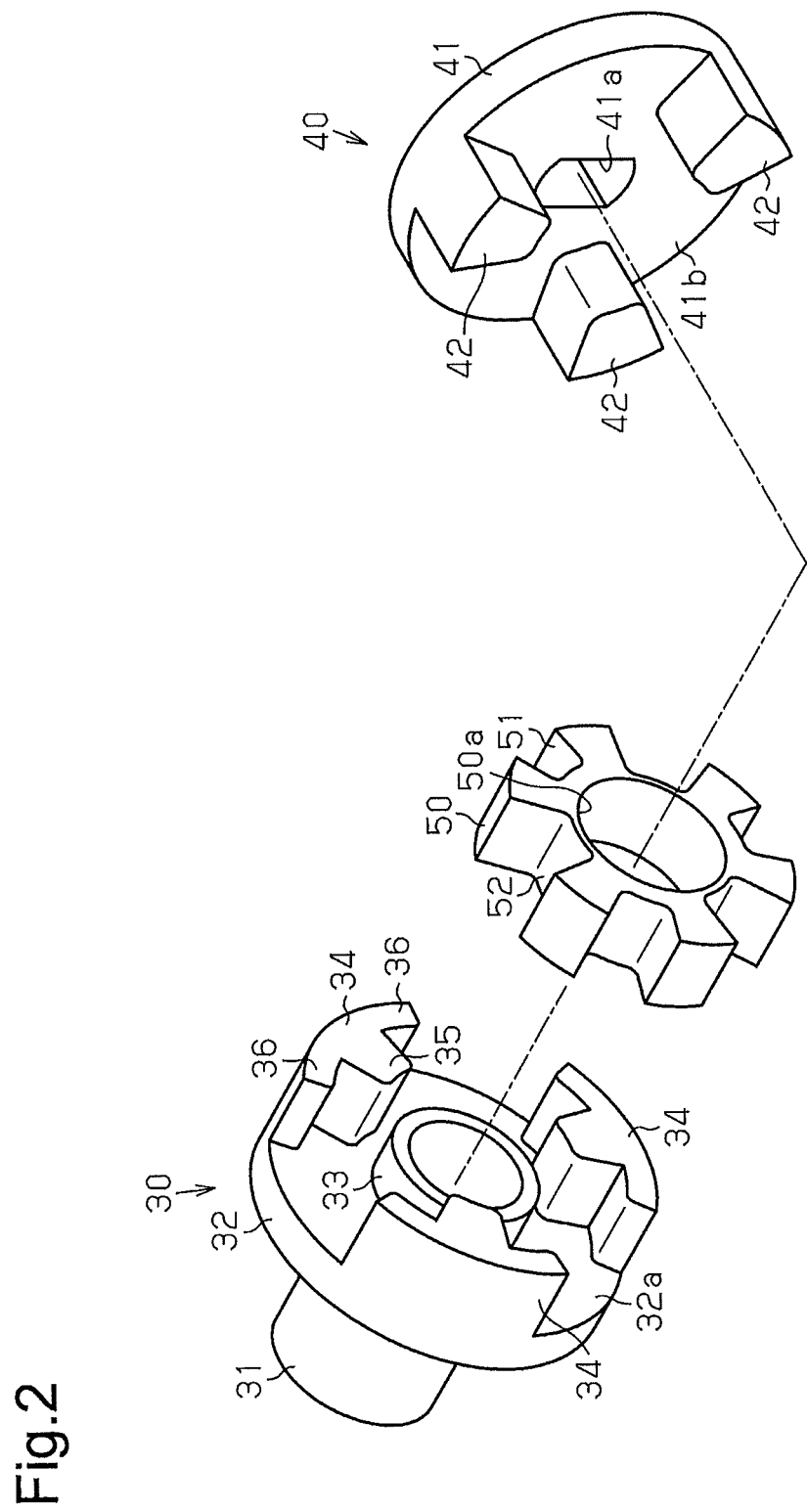
FIG. 2 is an exploded perspective view of a joint device shown in FIG. 1.
Figure 3A:
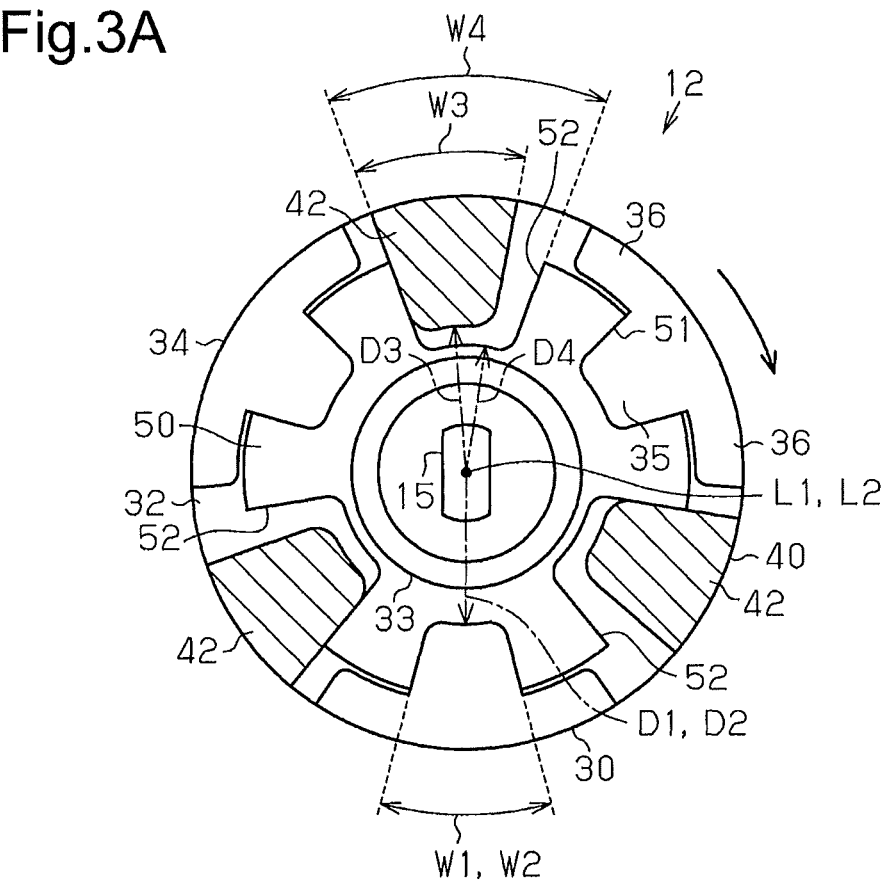
FIG. 3A is a cross-sectional view of the joint device shown in FIG. 2 during normal rotation transmission.
Figure 3B:
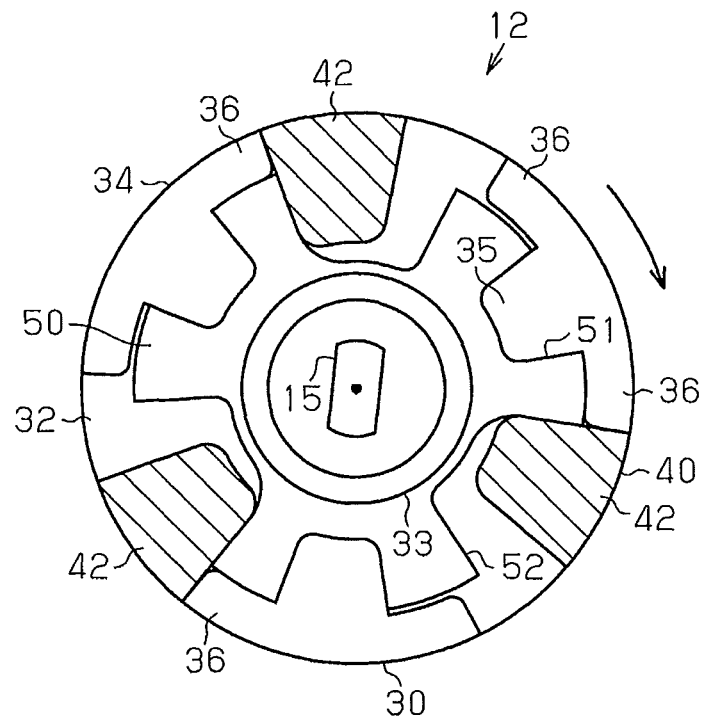
FIG. 3B is a cross-sectional view of the joint device shown in FIG. 2 when a worm shaft is locked.

As shown in FIGS. 2, 3A and 3B, the joint device 12 includes a drive rotor 30 fixed to the drive shaft 15, a driven rotor 40 fixed to the worm shaft 22, and a ring-shaped rubber buffer 50 located between the drive rotor 30 and the driven rotor 40.

The drive rotor 30 includes a fixing portion 31, in which a distal end of the drive shaft 15 having two flat opposing surfaces is fitted and fixed so that relative rotation is prohibited, and a disk 32 formed integrally with the fixing portion 31. The disk 32 is disk-shaped and orthogonal to the axis L1 of the drive shaft 15, and the fixing portion 31 is located at a portion of the disk 32 closer to the motor body 11. The disk 32 has a circular shape, the center of which is the axis L1 of the drive shaft 15.

The disk 32 includes an end surface 32a, which is located at the opposite side of the fixing portion 31. The central portion of the end surface 32a includes a cylindrical projection 33 that projects toward the opposite side of the fixing portion (opposite side of the motor body) in the axial direction. The cylindrical projection 33 has a circular shape, the center of which is the axis L1 of the drive shaft 15. That is, the center axis of the cylindrical projection 33 and the axis L1 of the drive shaft 15 are coaxial.

The surrounding portion (radially outer portion) of the cylindrical projection 33 includes three projections 34, each of which projects from the end surface 32a of the disk 32 in the same direction (axial direction) as the cylindrical projection 33. Each projection 34 is substantially T-shaped as viewed from the axial direction. The projection 34 includes a rotation transmission portion 35 (drive engagement portion), which is located at the circumferentially middle portion of the projection 34, and two drive contact portions 36, which extend from the rotation transmission portion 35 toward the two circumferential sides.

The rotation transmission portion 35 has a sectoral shape, the center of which is the axis L1 of the drive shaft 15 as viewed from the axial direction. The rotation transmission portion 35 is widened toward the radially outer side. The two circumferential end surfaces of the rotation transmission portion 35 extend in the radial direction of the axis L1 of the drive shaft 15. That is, the two circumferential end surfaces of the rotation transmission portion 35 are each planar and orthogonal to the rotation direction of the drive shaft 15 and the drive rotor 30.

The rotation transmission portions 35 are arranged at equal intervals (120-degree intervals) in the circumferential direction. The radially inner end surface of each rotation transmission portion 35 is arcuate, the center of which is the axis L1 of the drive shaft 15. The rotation transmission portions 35 are set to have the same inner diameter, that is, the same radius from the axis L1 of the drive shaft 15 to the radially inner end surface of the rotation transmission portion 35.

The drive contact portion 36 is formed on the radially outer portion of the rotation transmission portion 35. That is, the rotation transmission portion 35 projects toward the inner side in the radial direction from the drive contact portion 36. The drive contact portion 36 is arcuate, the center of which is the axis L1 of the drive shaft 15.

The driven rotor 40 includes a disk 41 orthogonal to an axis L2 of the worm shaft 22. The central portion of the disk 41 includes a fixing hole 41a, in which the end of the worm shaft 22 having two flat opposing surfaces is fitted and fixed so that relative rotation is prohibited. The disk 41 has a circular shape, the center of which is the axis L2 of the worm shaft 22. The disk 41 of the driven rotor 40 opposes the disk 32 of the drive rotor 30 in the axial direction.

The disk 41 includes an axially inner surface 41b (end surface located closer to the drive rotor 30). The axially inner surface 41b includes three rotation reception portions 42 (driven engagement portions), which are arranged at equal intervals (120-degree intervals) in the circumferential direction. The rotation reception portions 42 project toward the drive rotor 30 in the axial direction. The rotation reception portions 42 are arranged along the outer edge of the disk 41.

Each rotation reception portion 42 has a sectoral shape, the center of which is the axis of the driven rotor 40 as viewed from the axial direction (coaxial with the axis L2 of the worm shaft 22). The rotation reception portion 42 is widened toward the radially outer side. The two circumferential end surfaces of the rotation reception portion 42 extend in the radial direction of the driven rotor 40. That is, the two circumferential end surfaces of the rotation reception portion 42 are each planar and orthogonal to the rotation direction of the driven rotor 40.

The radially inner end surface of the rotation reception portion 42 is arcuate, the center of which is the axis L2 of the worm shaft 22. The rotation reception portions 42 are set to have the same inner diameter, that is, the same radius from the axis L2 of the worm shaft 22 to the radially inner end surface of the rotation reception portion 42. The rotation reception portion 42 is set to have the same inner diameter as the rotation transmission portion 35 of the drive rotor 30. When the joint device 12 is coupled, the rotation reception portions 42 are arranged in the circumferential direction between the rotation transmission portions 35 of the drive rotor 30.

The ring-shaped rubber buffer 50 is arranged between the disk 32 of the drive rotor 30 and the disk 41 of the driven rotor 40. The central portion of the buffer 50 includes a through hole 50a, into which the cylindrical projection 33 of the drive rotor 30 is inserted.

The outer surface of the buffer 50 includes first engagement recesses 51 respectively corresponding to the rotation transmission portions 35 and second engagement recesses 52 respectively corresponding to the rotation reception portions 42. The first engagement recesses 51 and the second engagement recesses 52 are alternately formed in the circumferential direction. The number of the first engagement recesses 51 is the same as that of the rotation transmission portions 35 (three in the present embodiment). The number of the second engagement recesses 52 is the same as that of the rotation reception portions 42 (three in the present embodiment).

The first and second engagement recesses 51 and 52 are recessed from the outer surface of the buffer 50 to the radially inner side. The first engagement recess 51 and the second engagement recess 52 are sectoral and widened toward the radially outer side. The circumferential side surfaces of the first and second engagement recesses 51 and 52 are formed in the radial direction. That is, the two circumferential end surfaces of each of the first and second engagement recesses 51 and 52 are each planar and orthogonal to the rotation direction.

As shown in FIG. 3A, the rotation transmission portions 35 are fitted in the first engagement recesses 51 without any gaps between the rotation transmission portions 35 and the first engagement recesses 51. More specifically, the circumferential width W1 of each rotation transmission portion 35 is set to be substantially equal to the circumferential width W2 of each first engagement recess 51. The inner diameter D1 of the rotation transmission portion 35 is set to be substantially equal to the outer diameter D2 of the bottom surface of the first engagement recess 51. That is, the arcuate surface of the first engagement recess 51 has a radius substantially equal to the arcuate surface of the opposing rotation transmission portion.

Thus, the cylindrical projection 33 and each rotation transmission portion 35 of the drive rotor 30 stably hold the buffer 50 so that the buffer 50 is not misaligned relative to the drive rotor 30 in the radial direction.

The rotation reception portions 42 are loosely fitted in the second engagement recesses 52 of the buffer 50 so that gaps are formed between the rotation reception portions 42 and the corresponding second engagement recesses 52. More specifically, the circumferential width W3 of each rotation reception portion 42 is set to be smaller than the circumferential width W4 of each second engagement recess 52. This forms a gap in the circumferential direction between the rotation reception portion 42 and the second engagement recess 52. The inner diameter D3 of the rotation reception portion 42 is set to be larger than the outer diameter D4 of the bottom surface of the second engagement recess 52. That is, the arcuate surface of the second engagement recess 52 has a smaller radius than that of the arcuate surface of the opposing rotation reception portion 42. This forms a gap in the radial direction between the rotation reception portion 42 and the second engagement recess 52.

When the joint device 12 is coupled, the projections of the buffer 50 between the first engagement recesses 51 and the second engagement recesses 52 are arranged in the circumferential direction between the rotation transmission portion 35 and the rotation reception portion 42. Thus, the rotation transmission portions 35 do not directly contact the rotation reception portions 42 in the rotation direction.

The operation of the present embodiment will now be described.

When the motor body 11 drives and rotates the drive shaft 15 (clockwise in FIGS. 3A and 3B), the drive rotor 30 of the joint device 12 rotates integrally with the drive shaft 15. When the rotation transmission portions 35 of the drive rotor 30 engage the first engagement recesses 51, the buffer 50 rotates integrally with the drive rotor 30.

As shown in FIG. 3A, when the drive shaft 15 and the worm shaft 22 are aligned (that is, the axes L1 and L2 are in conformance), the side surfaces of the three second engagement recesses 52 respectively contact the side surfaces of the three rotation reception portions 42 in the rotation direction. Thus, the rotation of the drive rotor 30 (rotation transmission portion 35) is transmitted to the driven rotor 40 (rotation reception portion 42) by the buffer 50. During transmission of rotation, the drive rotor 30, which has high rigidity, does not directly contact the driven rotor 40, which has high rigidity. This limits the generation of noise.

If excessive load applied to the worm shaft 22 locks and stops the rotation of the driven rotor 40 during the transmission of rotation, the drive contact portion 36 of each projection 34 of the drive rotor 30 contacts the rotation reception portion 42 in the rotation direction as shown in FIG. 3B. This stops the rotation of the drive shaft 15 of the motor body 11. Thus, when the worm shaft 22 is locked, direct contact of the drive rotor 30 and the driven rotor 40 limits compression of the buffer 50 caused by a strong force. That is, the buffer 50 is not further compressed by the rotation transmission portions 35 and the rotation reception portions 42 from the locations where the drive contact portions 36 contacts the rotation reception portions 42. This reduces wear of the buffer 50.

For example, coupling tolerances of the yoke housing 14 of the motor body 11 and the gear housing 21 of the reduction drive 13 may result in misalignment of the axis L1 of the drive shaft 15 and the axis L2 of the worm shaft 22 when coupling the drive rotor 30 and the driven rotor 40.

Figure 4:
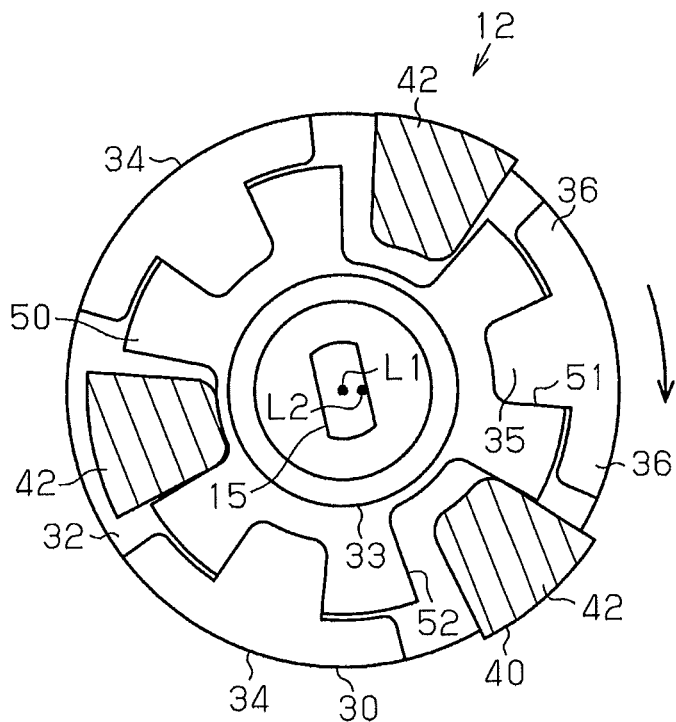
FIG. 4 is a cross-sectional view illustrating the transmission of rotation when misalignment occurs at the joint device of FIG. 2.

As shown in FIG. 4, this misaligns the drive rotor 30 and the driven rotor 40 in the joint device 12. The buffer 50, which is held by the drive rotor 30, is coaxial with the drive rotor 30 and misaligned relative to the driven rotor 40. The rotation reception portions 42 of the driven rotor 40, loosely fitted in the second engagement recesses 52 of the buffer 50 with gaps formed between the rotation reception portion 42 and the second engagement recess 52, allows for misalignment in the radial direction.

Figure 5:
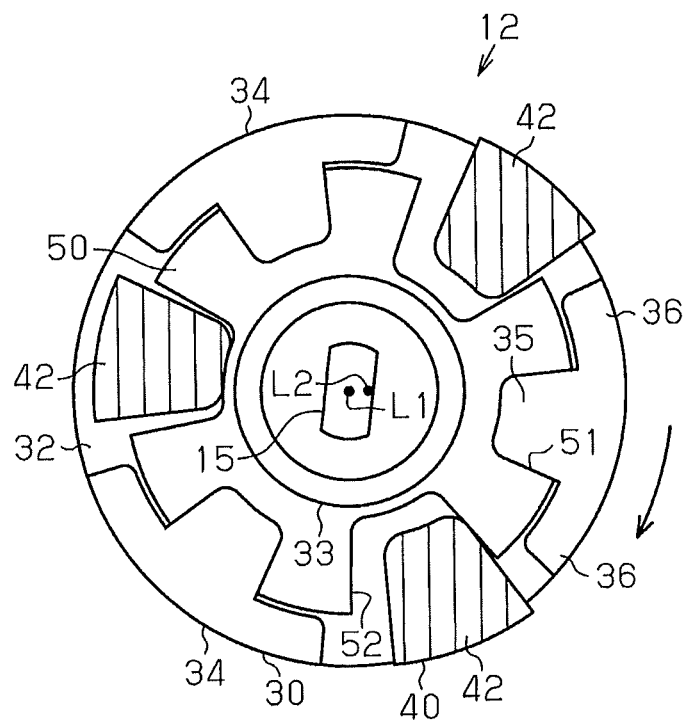
FIG. 5 is a cross-sectional view illustrating the transmission of rotation when misalignment occurs at the joint device of FIG. 2.

When the axis L1 of the drive shaft 15 and the axis L2 of the worm shaft 22 are misaligned, rotation is transmitted by one or two of the three sets of the rotation reception portion 42 and the second engagement recess 52 as shown in FIGS. 4 and 5. When rotation is transmitted under a misaligned state, the side surfaces of the second engagement recesses 52 and the side surfaces of the rotation reception portions 42 repeatedly contact and separate as they move. In the present embodiment, the rubber buffer 50 contacts the rotation reception portions 42. This limits the generation of noise when the rotation reception portions 42 contacts the buffer 50.

The advantages of the present embodiment will now be described.

(1) The drive rotor 30 includes the rotation transmission portions 35 that project toward the driven rotor 40 in the axial direction. The driven rotor 40 includes the rotation reception portions 42 that projects toward the drive rotor 30 in the axial direction. The outer surface of the buffer 50 includes the first engagement recesses 51, which are engageable with the rotation transmission portions 35 in the rotation direction, and the second engagement recesses 52, which are engageable with the rotation reception portion 42 in the rotation direction. The outer diameter D4 of the bottom surface of each second engagement recess 52 is set to be smaller than the inner diameter D3 of the rotation reception portion 42. Since this structure forms a gap in the radial direction between the bottom surface of the second engagement recess 52 and the rotation reception portion 42, misalignment of the drive shaft 15 and the worm shaft 22 is allowed in the radial direction. Thus, rotation can be smoothly transmitted even when the drive shaft 15 and the worm shaft 22 are misaligned.

(2) The outer diameter D2 of the bottom surface of each first engagement recess 51 is set to be substantially equal to the inner diameter D1 of each rotation transmission portion 35. This does not form a gap in the radial direction between the bottom of the first engagement recess 51 and the rotation transmission portion 35. In this manner, the buffer 50 has gaps for the driven rotor 40 to allow for misalignment in the radial direction but does not have gaps in the radial direction for the drive rotor 30, to stably hold the drive rotor 30.

(3) The circumferential width W2 of the first engagement recess 51 is substantially equal to the circumferential width W1 of the rotation transmission portion 35. The circumferential width W4 of the second engagement recess 52 is set to be larger than the circumferential width W3 of the rotation reception portion 42. This structure allows for integral rotation of the buffer 50 and the drive rotor 30 and further stably holds the buffer 50. This structure also forms gaps in the circumferential direction between the rotation reception portions 42 and the second engagement recesses 52. Thus, misalignment is allowed in the radial direction between the buffer 50 and the driven rotor 40 in a further preferable manner.

(4) The drive contact portions 36 of the drive rotor 30 contacts the rotation reception portions 42 in the rotation direction when the load of the driven rotor 40 is greater than or equal to a predetermined level. In this structure, the drive contact portions 36 directly contact the rotation reception portions 42 in the rotation direction when excessive load is applied to the worm shaft 22 during the rotation of the drive shaft 15. Thus, the buffer 50 is not compressed more than necessary. This reduces wear of the buffer 50.

The above embodiment may be modified as follows.

In the above embodiment, the drive rotor 30 does not have to include the drive contact portions 36 that contact the rotation reception portions 42 in the rotation direction when the worm shaft 22 is locked. For example, the drive contact portion 36 may be omitted from the drive rotor 30 so that the driven rotor 40 includes a driven contact portion extending in the circumferential direction from the rotation reception portion 42. The drive contact portion 36 may be separated from the rotation transmission portion 35 so that the drive contact portion 36 and the rotation transmission portion 35 are different bodies.

In the above embodiment, the circumferential width W3 of the rotation reception portion 42 does not have to be set to be smaller than the circumferential width W4 of the second engagement recess 52. For example, the circumferential width W3 may be set to be substantially equal to the circumferential width W4.

Figure 6:
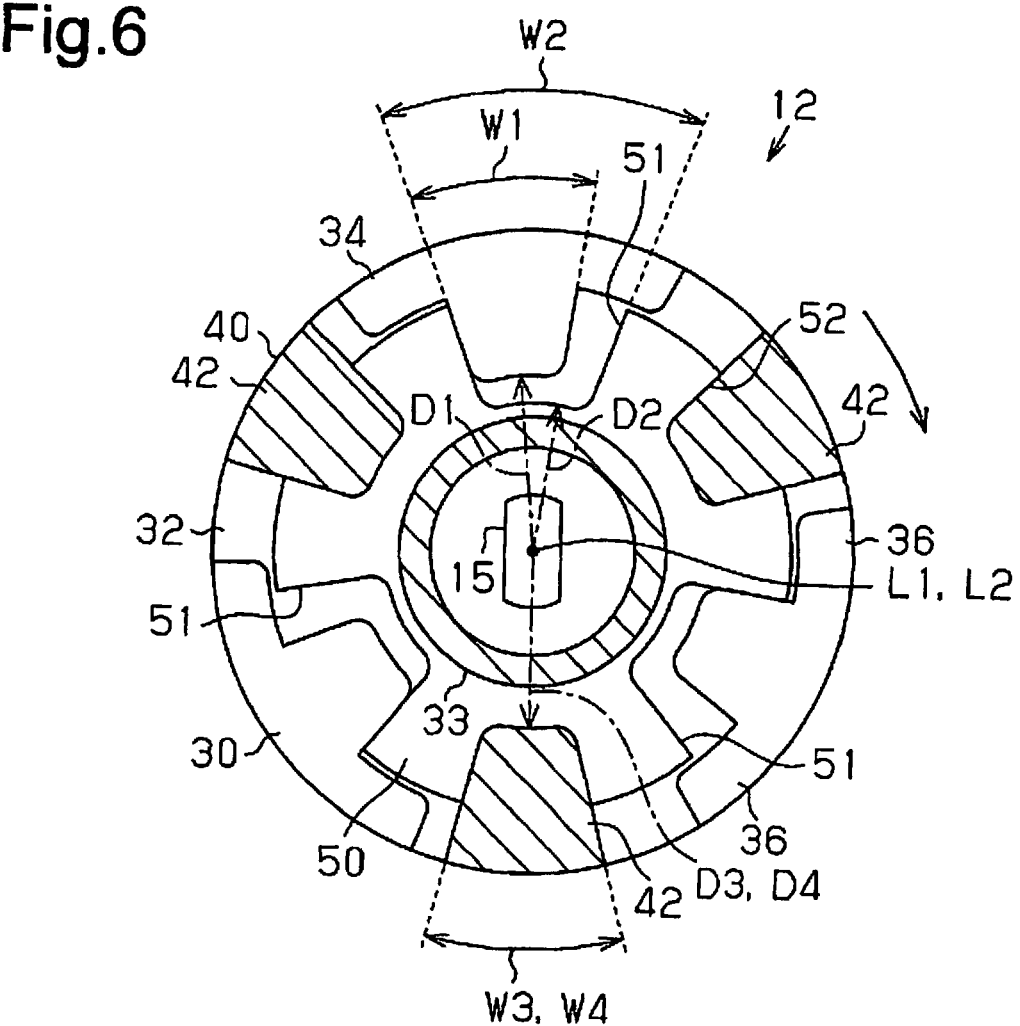
FIG. 6 is a cross-sectional view of a joint device according to another example.

In the above embodiment, the rotation transmission portions 35 are fitted in the first engagement recesses 51 without any gaps between the rotation transmission portions 35 and the first engagement recesses 51, and the rotation reception portions 42 are loosely fitted in the second engagement recesses 52 with gaps between the rotation reception portion 42 and the second engagement recess 52. Instead, as shown in FIG. 6, the rotation transmission portion 35 may be loosely fitted in the first engagement recess 51 with gaps between the rotation transmission portion 35 and the first engagement recess 51, and the rotation reception portion 42 may be fitted in the second engagement recess 52 without any gaps between the reception portion 42 and the second engagement recess 52. For example, the circumferential width W1 of each rotation transmission portion 35 is set to be smaller than the circumferential width W2 of each first engagement recess 51, and the inner diameter D1 of each rotation transmission portion 35 is set to be larger than the outer diameter D2 of the bottom surface of each first engagement recess 51. The circumferential width W3 of each rotation reception portion 42 is set to be substantially equal to the circumferential width W4 of each second engagement recess 52. The inner diameter D3 of each rotation reception portion 42 is set to be substantially equal to the outer diameter D4 of the bottom surface of each second engagement recess 52. That is, the arcuate surface of the first engagement recess 51 has a radius smaller than that of the opposing rotation transmission portion 35. The arcuate surface of the second engagement recess 52 has a radius substantially equal to that of the rotation reception portion 42. Thus, the buffer 50 is held by the driven rotor 40 and can be misaligned relative to the drive rotor 30. It is preferable that the cylindrical projection 33 be formed on the driven rotor 40, not on the drive rotor 30.

The invention claimed is:

1. A joint device comprising:
a drive rotor fixed to a drive shaft;
a driven rotor fixed to a driven shaft; and
a ring-shaped buffer located between the drive rotor and the driven rotor, wherein;
the drive rotor includes a drive engagement portion that projects toward the driven rotor in an axial direction;
the driven rotor includes a driven engagement portion that projects toward the drive rotor in the axial direction;
the buffer includes an outer surface, which includes a first engagement recess and a second engagement recess that are recessed toward a radially inner side;
the drive engagement portion is inserted into the first engagement recess engageable in a rotation direction;
the driven engagement portion is inserted into the second engagement recess engageable in the rotation direction; and
an outer diameter of a bottom surface of the second engagement recess is smaller than an inner diameter of the driven engagement portion; and
the drive rotor and the driven rotor respectively include a drive contact portion and a driven contact portion, and the drive contact portion and the driven contact portion directly contact each other in the rotation direction when a load acting on the driven rotor is greater than or equal to a predetermined level.

2. The joint device according to claim 1, wherein:
the outer diameter of the bottom surface of the second engagement recess is smaller than the inner diameter of the driven engagement portion; and
the outer diameter of the bottom surface of the first engagement recess is substantially equal to the inner diameter of the drive engagement portion.

3. The joint device according to claim 2, wherein:
a circumferential width of the first engagement recess is substantially equal to a circumferential width of the drive engagement portion; and
a circumferential width of the second engagement recess is larger than a circumferential width of the driven engagement portion.

4. The joint device according to claim 1, wherein:
the second engagement recess includes an arcuate surface extending around an axis;
the driven engagement portion includes an arcuate surface extending around the axis and opposed to the arcuate surface of the second engagement recess;
the first engagement recess includes an arcuate surface extending around an axis;
the drive engagement portion includes an arcuate surface extending around the axis and opposed to the arcuate surface of the first engagement recess; and
the arcuate surface of the second engagement recess has a smaller radius than the arcuate surface of the opposing driven engagement portion.

5. A motor comprising the joint device according to claim 1.

6. A joint device comprising:
a drive rotor fixed to a drive shaft;
a driven rotor fixed to a driven shaft; and
a ring-shaped buffer located between the drive rotor and the driven rotor, wherein:
the drive rotor includes a drive engagement portion that projects toward the driven rotor in an axial direction;
the driven rotor includes a driven engagement portion that projects toward the drive rotor in the axial direction;
the buffer includes an outer surface, which includes a first engagement recess and a second engagement recess that are recessed toward a radially inner side;
the drive engagement portion is inserted into the first engagement recess engageable in a rotation direction;
the driven engagement portion is inserted into the second engagement recess engageable in the rotation direction;
an outer diameter of a bottom surface of the first engagement recess is smaller than an inner diameter of the drive engagement portion; and
the drive rotor and the driven rotor respectively include a drive contact portion and a driven contact portion, and the drive contact portion and the driven contact portion directly contact each other in the rotation direction when a load acting on the driven rotor is greater than or equal to a predetermined level.

7. The joint device according to claim 6 wherein:
the outer diameter of the bottom surface of the first engagement recess is smaller than the inner diameter of the drive engagement portion; and
the outer diameter of the bottom surface of the second engagement recess is substantially equal to the inner diameter of the driven engagement portion.

8. The joint device according to claim 7, wherein:
a circumferential width of the second engagement recess is substantially equal to a circumferential width of the drive engagement portion; and
a circumferential width of the first engagement recess is larger than a circumferential width of the driven engagement portion.

9. The joint device according to claim 6, wherein:
the second engagement recess includes an arcuate surface extending around an axis;
the driven engagement portion includes an arcuate surface extending around the axis and opposed to the arcuate surface of the second engagement recess;
the first engagement recess includes an arcuate surface extending around an axis;
the drive engagement portion includes an arcuate surface extending around the axis and opposed to the arcuate surface of the first engagement recess; and
the arcuate surface of the first engagement recess has a smaller radius than the arcuate surface of the opposing drive engagement portion.

10. A motor comprising the joint device according to claim 6.

\* \* \* \* \*